Figure 1:
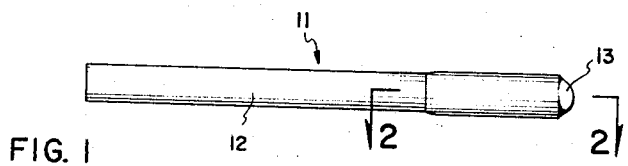

Oct. 31, 1967  J. D. ENSIGN ET AL  3,349,896
DISPOSABLE SHEATH AND SHEATH RETAINER FOR
TEMPERATURE SENSING PROBES
Filed Sept. 22, 1965

INVENTORS:
JOHN D. ENSIGN
BY HIDEO HASHIMOTO
*Mallinckrodt and
Mallinckrodt*
ATTORNEYS

United States Patent Office 3,349,896
Patented Oct. 31, 1967

3,349,896
DISPOSABLE SHEATH AND SHEATH RETAINER FOR TEMPERATURE SENSING PROBES
John D. Ensign, Brigham City, and Hideo Hashimoto, Deweyville, Utah, assignors to Measurement Science Corporation, Perry, Utah, a corporation of Utah
Filed Sept. 22, 1965, Ser. No. 489,122
13 Claims. (Cl. 206—16.5)

This invention relates to disposable sheaths that serve as sanitary covers for probes used with temperature indicating devices to measure internal body temperature, and to a sheath retainer for use on such probes.

In determining human body temperature, it is customary to insert a temperature sensing probe into a body opening of an individual. Generally the probe employed is a temperature indicating device such as a glass mercury bulb type thermometer. However, other devices having separate probes adapted to be inserted in body cavities such as the "Resistance Thermometer," disclosed in the co-pending application for patent of John D. Ensign and David M. Allen, Ser. No. 483,038, filed Aug. 27, 1965, can also be used. When the same probe is used to take the body temperature of a number of individuals, it is necessary to completely and thoroughly sterilize the probe after each use. If it is properly done, this requires time consuming and expensive procedures, and is especially bothersome in doctors' offices or hospitals where a great many temperatures are taken.

In U.S. Patent No. 3,190,436, issued June 22, 1965, to M. Diamant entitled "Protective Sheath for Clinical Thermometers" there is disclosed an elongate tubular sheath of supple transparent material having tabs to facilitate installation and removal from a mercury bulb type thermometer. It has also been known to use heat sealed polyethylene envelopes as protective sheaths for temperature sensing probes. While these known sheaths have been effective as sterile covers for temperature sensing probes, there are certain disadvantages in their use. For example, they are cumbersome to install on the probes, have rough edges, and are vulnerable to punctures and to tearing resulting from their being stretched beyond the elastic limit of the material from which they are constructed. Furthermore, they do not provide for a construction and use such that temperatures are consistently obtained within a substantially uniform period of time.

Accordingly, it is a principal object of this invention to provide an inexpensive sterile sheath which can be easily installed on and removed from a temperature sensing probe without tearing. Another object is to provide a special means for holding sheaths firmly in place when they are installed on the probe, and for limiting the amount that each sheath can be stretched as it is applied to the probe, so that it will not tear and so that uniform temperature response times are consistently obtained with probes fitted with the sheaths.

A principal feature of this invention is the provision of a rigid tube which has one end covered with a diaphragm of heat conductive material capable of fitting over the end of a temperature sensing probe when the tube is installed thereon. Another feature of this invention is the provision of a resilient sheath retainer adapted to fit on a probe and having protuberances that limit the extent to which the probe will extend into the sheath and that hold the sheath on the probe.

Additional objects and features of the invention will become apparent from the following detailed description of the presently preferred specific embodiment illustrated in the accompanying drawing as an example of how the generic inventive concepts disclosed can be applied in practice.

Figure 2:
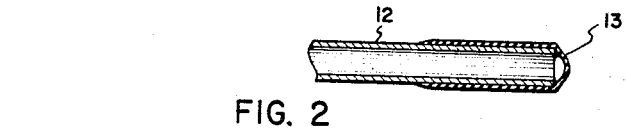
Figure 3:
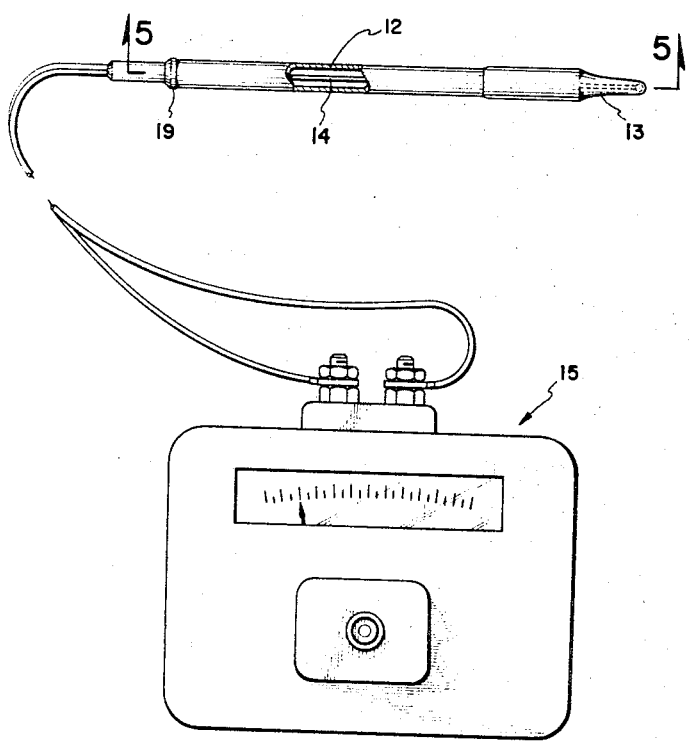
Figure 4:
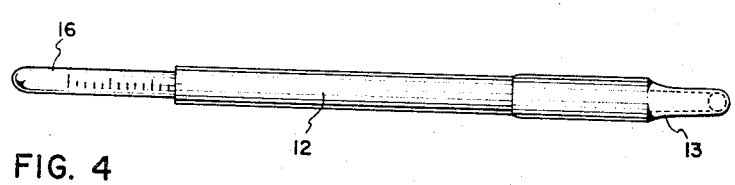
Figure 5:
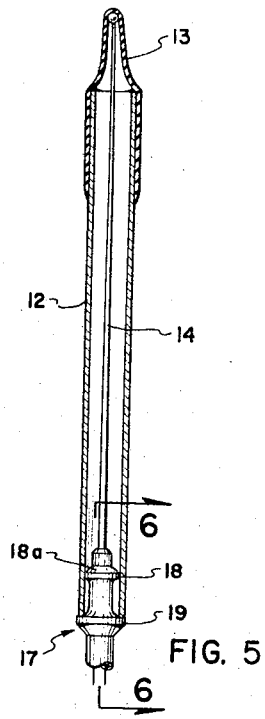
Figure 6:
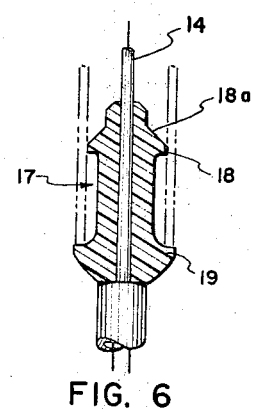

In the drawing:

FIG. 1 is a view in side elevation of a disposable sheath according to the invention;

FIG. 2, a horizontal section of the end of the sheath taken on the line 2—2 of FIG. 1;

FIG. 3, a view in side elevation of the probe sheath of FIG. 1 installed on the probe of an electronic thermometer, and partially broken away to show the probe;

FIG. 4, a view in side elevation of the sheath of FIG. 1 installed on a conventional glass, mercury bulb type thermometer;

FIG. 5, is an enlarged horizontal section taken on the line 5—5 of FIG. 3, and turned 90° for convenience of illustration; and FIG. 6 is a still further enlarged section through the sheath retainer, taken on the line 6—6 of FIG. 5.

Referring now to the drawing:

Disposable sheath 11 consists of an elongate tube portion 12 having one end sealed with a diaphragm of heat conductive material 13. In the presently preferred embodiment the elongate tube 12 is sufficiently rigid to enable the tube to be inserted on a probe without buckling or folding. This construction enables easy installation of the sheath on the probe of a thermometer merely by grasping the tube 12 between the thumb and forefinger, inserting it over the tip of the probe and then sliding it, if necessary, until it is in the desired position with respect to the probe. In many cases, tube 12 can be dimensioned so that it will fit snugly on the probe and be frictionally held in place. In other situations, tube 12 will be considerably larger in diameter than the probe and used in conjunction with a sheath retainer such as will be hereinafter described. With this latter arrangement a single size sheath can be easily used with a large number of commerically available thermometers and other temperature sensing devices.

Many readily available materials can be used in constructing tube 12. Examples of these materials are lengths of glass tubing, copper and other metallic tubing, paper tubing, and plastic tubing. In many instances tubular materials of the foregoing type which are available on the market for other purposes can be converted for use in this invention, thereby contributing to the advantages of the invention from the standpoints of low cost and ready availability of materials.

One end of tube 12 is covered with a heat conductive diaphragm 13 capable of fitting over the end of a temperature sensing probe. It is presently preferred to use a white natural rubber latex composition as the heat conductive material for diaphragm 13, since this material is smooth and durable and when stretched thin it does not prevent rapid transfer of heat to the sensing element of the probe. Other materials which will allow rapid heat conductivity from the individual whose temperature is being measured to the sensing element of the probe can be substituted. For example, the material can be any available elastomeric, polymeric, or resinous material which conducts heat readily, that is durable even when so thin that it does not act as a heat barrier and, preferably, that is stretchable. In addition to the foregoing qualities, the selected diaphragm material should also adhere readily to tube 12. If a rubber latex composition is used to form diaphragm 13, it is preferred to apply it to the tube 12 by dipping one end of the tube into the latex solution and allowing the latex to harden on the tube, thereby assuring a suitable bond. Diaphragm 13 can also be installed in the form of an elongate, preformed resilient tube stretched over the end of rigid tube 12. Of course, the diaphragm can be bonded to the tube by means of adhesives if desired, or it can be clamped or otherwise affixed thereto.

The diaphragm 13 across the end of the probe sheath can have any configuration, providing that there is enough material when the probe sheath is installed on a probe to fully cover the end of the probe protruding beyond tube 12. It is presently preferred to have a small slack bubble of material extending from the end of the tube. In a typical situation, the bubble extends to a length of approximately one half the tube diameter, thereby allowing enough room for the end of a probe to be positioned in the bubble before stretching of the material, if desired.

The disposable sheath of the present invention can be used on a variety of temperature sensing probes, such as that shown at 14, FIG. 3 and 5 and 6, forming part of an electronic thermometer, the meter housing of which is shown at 15 and the glass, mercury bulb type thermometer 16 shown in FIG. 4. Depending upon the dimensions of the particular probe used, the sheath can be either used alone or with a special sheath retainer to be described.

The sheath retainer 17, previously referred to, is constructed in the form of a collar that will surround a probe and that has protuberances 18 and 19 constituting a sheath retaining flange and a sheath stop flange, respectively. The sheath retainer is preferably made of a resilient material, and the sheath retaining flange 18 has a sloping shoulder 18a that terminates in an outside diameter slightly larger than the inside diameter of the tube 12 of sheath 11. When sheath 11 is installed on a probe 14, the open end of tube 12 slides on sloping shoulder 18 to finally slightly compress the enlarged section of the flange. The resilient tendency of the collar 17 to expand then securely retains sheath 11 in place. The sheath stop flange 19 limits the extent to which probe sheath 11 can be pulled onto probe 14 and therefore controls the stretching of diaphragm 13. This is extremely important, since it not only governs the distance the probe is inserted into diaphragm 13, and prevents stretching that will cause failure, but it also controls the thickness of the stretched diaphragm material so that each sheath used that has the same type of construction, will allow heat transfer at the same rate. This is a matter of concern since it insures that a substantially constant time interval will occur for all readings taken with the same instrument. Although concentric flanges are presently preferred to form the protuberances of retainer 17, other configurations such as bubbles, bumps, etc., can be used to function in the same manner as the flanges.

Sheath retainer 17 can be installed in any suitable manner on a temperature sensing probe by molding in situ, adhesive bonding, and other well known securement methods.

Although the principal uses of the disposable sheath and the sheath retainer of this invention are with temperature sensing probes, it is obvious that they can also be used with other probes and elongate instruments that require a disposable sheath.

Whereas, there is here illustrated and specifically described a certain preferred construction which is presently regarded as the best mode of carrying out the invention, it should be understood that various changes can be made and other constructions adopted without departing from the inventive subject matter particularly pointed out and claimed herebelow.

We claim:

1. A disposable sheath for use on a temperature sensing probe, comprising an elongate, non stretchable tube sufficiently rigid to be inserted on a probe without buckling or folding; and a heat conductive diaphragm of stretchable material sealing one end of said tube.

2. A disposable sheath as recited in claim 1, wherein the diaphragm is bonded to the tube.

3. A disposable sheath as recited in claim 2, wherein the diaphragm is adhesively bonded to the tube.

4. A disposable sheath as recited in claim 1, wherein the diaphragm forms a slack bubble extending from the end of the tube.

5. A disposable sheath as recited in claim 1, wherein the stretchable material is natural rubber latex.

6. A disposable sheath as recited in claim 1, wherein the stretchable material is selected from the group consisting of resinous, elastomeric, and polymeric materials.

7. A temperature sensing device, comprising in combination an elongate temperature sensing probe having a temperature sensing element in one end and its opposite end adapted to be connected to a meter housing;
a sheath retainer collar attached to said probe adjacent to the end of the probe adapted to be connected to the meter housing and adapted to secure a sheath on said probe; and
a disposable sheath including an elongate non stretchable tube of sufficient rigidity to be inserted on said probe and said retaining collar without buckling or folding and a heat conductive diaphragm of stretchable material closing one end of the tube, whereby when said sheath is telescoped onto the probe and is frictionally held thereon by the retainer collar, the diaphragm is stretched tightly over the end of the probe containing the temperature sensing element.

8. The combination of claim 7, wherein the sheath retainer includes at least one protuberance extending therefrom to grip the interior of the elongate tube to thereby hold the sheath on the probe.

9. The combination of claim 8, further including at least one other protuberance arranged to provide stop means for limiting the extent to which the sheath can be pulled onto the probe.

10. The combination of claim 9, wherein the protuberances are resilient and comprise concentric flanges.

11. A temperature sensing probe device, comprising an elongated probe having a temperature sensing end; and a sheath retainer attached to the opposite end of said probe and having a sheath retaining first protuberance extending therefrom, said first protuberance being adapted to engage the interior of a disposable sheath to thereby hold said sheath in a fixed position surrounding the probe, and having, further, a second protuberance spaced toward said first protuberance and extending outwardly from said first protuberance as a stop member limiting the extent of application of said sheath over and with respect to said probe.

12. The device of claim 11, wherein the sheath retainer is constructed of resilient material, and the protuberances comprise concentric flanges.

13. The device of claim 11, wherein the sheath retainer is resilient.

References Cited

UNITED STATES PATENTS

| | | | |
|---|---|---|---|
| 1,363,259 | 12/1920 | Mills | 206—16.5 |
| 2,677,965 | 3/1954 | Saffir | 206—16.5 |
| 2,969,151 | 1/1961 | Katzin | 206—16.5 |
| 3,221,555 | 12/1965 | Biber | 206—16.5 |
| 3,254,533 | 6/1966 | Tongret | 73—262 |

THERON E. CONDON, Primary Examiner.

WILLIAM T. DIXSON, Jr., Examiner.